June 26, 1956  J. O. POLZER  2,751,724

BELT GRINDING APPARATUS

Filed Dec. 26, 1952  2 Sheets—Sheet 1

*INVENTOR.*
JOHN O. POLZER

BY *Andrus & Scealer*

ATTORNEYS

June 26, 1956  J. O. POLZER  2,751,724
BELT GRINDING APPARATUS
Filed Dec. 26, 1952  2 Sheets-Sheet 2
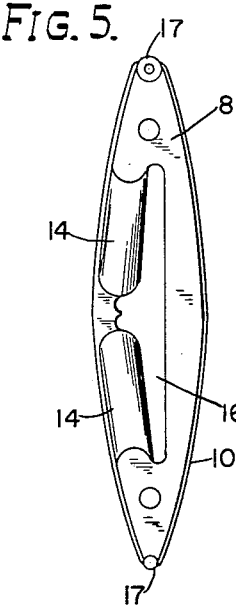
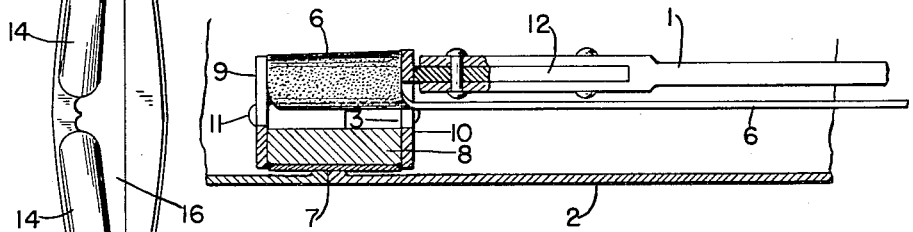
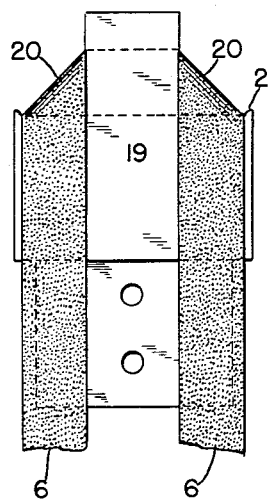
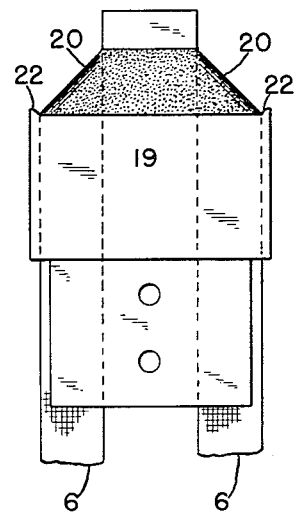
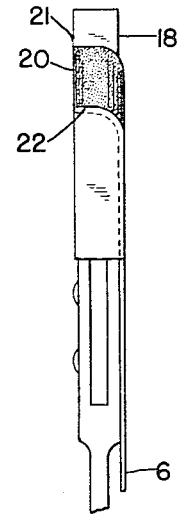
INVENTOR.
JOHN O. POLZER
BY *Andrus & Scales*
ATTORNEYS

United States Patent Office 2,751,724
Patented June 26, 1956

2,751,724

BELT GRINDING APPARATUS

John O. Polzer, Milwaukee, Wis., assignor to A. O. Smith Corporation, Milwaukee, Wis., a corporation of New York Application December 26, 1952, Serial No. 328,060

5 Claims. (Cl. 51—141)

This invention relates to an abrasive belt grinding apparatus and more particularly to a belt grinding apparatus employed to grind the internal surfaces of a thin hollow member such as an airplane propeller blade.

When two thin hollow airfoil-contour sections of a propeller blade are welded together, both the internal and exterior surfaces of the weld seam must be ground down to remove the flash metal. Great difficulty has been encountered in attempting to grind the internal surface of the transverse weld seams for the seam is located a considerable distance from the open end or ends of the welded member in a rather inaccessible position. A grinding wheel disposed at the end of a long rod is sometimes inserted within the open end of the member to grind these seams. However, the use of the grinding wheel is generally unsatisfactory for the wheel being at the end of a long shaft tends to wobble excessively and the wheel cannot adequately be inserted into the leading and trailing edge portions of the blade to grind the weld seam in these areas.

An object of the present invention is to provide an apparatus for grinding the internal weld seams of a thin hollow metal article wherein the grinding surface is disposed at a considerable distance from the driving mechanism in order that the apparatus may be inserted within the article and grind the seam.

Another object of the invention is to provide an internal belt grinding apparatus which will readily grind the internal transverse weld seams in a hollow propeller blade.

A further object of the invention is to provide an abrasive belt grinding apparatus which is adapted to effectively grind the portions of the internal weld seams located in the vicinity of the leading and trailing edge portions of thin hollow propeller blades.

Another object is to provide a grinding apparatus employing a moving abrasive belt which will grind the portions of the internal weld seams in a propeller blade which are located behind the terminal of the longitudinal reinforcing ribs.

The present invention is directed to a belt grinder which is particularly adaptable to grinding the internal transverse weld seams in a thin hollow member such as a propeller blade. The apparatus consists of a long slender frame adapted to be inserted within the blade. A motor is attached to the outer end of the frame and serves to drive an endless abrasive belt. The inner end of the frame carries a fixture around which the belt travels.

In one embodiment of the invention the fixture is constructed so that the belt, which approaches the fixture moving longitudinally of the blade in a generally horizontal plane, is twisted at right angles and travels transversely to the blade about a roller disposed at one end of the fixture. The belt then moves transversely along the bottom surface of the fixture, thereafter upwardly around a second end roller and is then again twisted so that it emerges from the fixture in a longitudinal relation to the blade and in substantial horizontal plane.

By this construction the grinding of the transverse weld seams is readily accomplished by the portion of the belt moving transversely in contact with the top and bottom surfaces of the fixture, and the weld seams disposed in the area of the leading and trailing edge portions are effectively ground by the portion of the belt traveling over the end rollers.

In a second embodiment, the fixture is so designed that the belt approaching the fixture is twisted and travels transversely to the blade along the bottom grinding surface of the fixture. The belt is then again twisted and leaves the fixture traveling in a longitudinal relation to the blade. In this embodiment the grinding is adapted to be done by the portion of the belt traveling in contact with the bottom surface of the fixture.

Other objects and advantages of the present invention will appear in the course of the following description.

In the drawings:

Fig. 5 is a front view of the fixture of Fig. 3 with the front plate removed;

Fig. 6 is an elevational view of the fixture of Fig. 3 as disposed within the blade with a part of the fixture being broken away in section;

Fig. 7 is a top plan view of a second embodiment of the fixture;

Fig. 8 is a bottom view of the fixture of Fig. 7; and

Fig. 9 is a side elevation of the fixture of Fig. 7.

Figure 1:
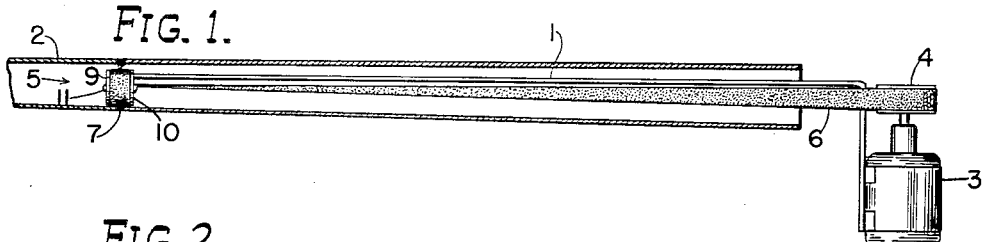
Fig. 1 is an elevational view of the belt grinder as used in a thin hollow propeller blade with the blade being broken away in section.

Referring to the drawings there is shown a portable abrasive belt grinding apparatus for grinding the internal weld seams in a thin hollow metal article such as a propeller blade.

The apparatus comprises a long flat frame member 1 adapted to be inserted within the propeller blade 2 or the like. The outer portion of frame member 1 which is disposed outside of the blade 2 is bent at an angle of about 90 degrees to the main body of the frame member and is suitably attached to the casing of a motor 3. Motor 3 serves to drive a pulley 4 which is carried on the outer end of the motor shaft.

The inner end of frame member 1 is removably secured to a fixture 5 and the grinding is accomplished by an endless abrasive belt 6 which travels about pulley 4 and fixture 5 and is driven by the pulley.

As seen in Fig. 1 the portion of the belt 6 in contact with the driving pulley 4 is disposed in a substantially vertical plane and the belt is twisted throughout its length so that the portions of the belt entering and leaving the fixture 5 are both in substantially the same horizontal plane.

In order to effectively grind the internal transverse weld seams 7 of the blade 2, the belt 6 which approaches the fixture 5 while moving in a direction longitudinally of the blade, 2 is twisted by the fixture 5 so that it travels transversely of the blade in the area of grinding.

The fixture 5 includes a generally elliptical insert 8 about which the belt 6 travels, and a forward and rear plate 9 and 10 which are secured to the forward and rear faces, respectively, of insert 8 by rivets 11, bolts or the like.

The plates 9 and 10 have a contour substantially similar to that of insert 8, but extend radially outwardly beyond the insert 8 to provide a groove or way within which the belt 6 travels. The projecting edges of plates 9 and 10 serve to guide the belt and prevent the same from slipping from the insert during operation.

The shape of insert 8 and plates 9 and 10 is such that they are widest at the mid-portion and taper in either direction toward the ends. The width of the insert 8 and magnitude of taper may vary depending on the shape of the article into which the fixture is to be disposed. For example, when adapted for use with a propeller blade having a leading edge airfoil of different contour from that of the trailing edge, the taper of the insert may be designed accordingly so that one end of the insert will correspond to the leading edge portion of the blade and the other end will correspond to the trailing edge contour. By this construction the end portions of the insert 8 may be moved laterally into the corresponding end portions of the blade and grinding may be accomplished within these generally inaccessible areas.

The fixture 5 is attached to frame member 1 by means of tongue 12 which is welded endwise to the rear plate 10 and is removably secured between the bifurcated inner end of frame member 1 by suitable bolts.

To permit belt 6 to be twisted at substantially right angles upon entering and leaving fixture 5, insert 8 is provided with a central elongated opening 13 which receives the belt 6 and a pair of diagonally extending rounded edge portions, indicated by 14, which border the opening 13. The edge portions 14 of insert 8 are in approximate relation adjacent rear plate 10 and diverge outwardly at an angle of approximately 45 degrees toward forward plate 9.

Plate 10 is provided with an elongated slot 15 aligned with opening or slot 13 in insert 8 and through which the belt 6 enters and leaves the fixture 5. The portions of belt 6 entering and leaving the fixture 5 are disposed in a general edge-to-edge relation within the slot 15.

To facilitate threading of the belt onto the fixture the upper edge portion of forward plate 9 may be provided with a recess 16 which is also in alignment with opening 13 in insert 8.

The belt 6 traveling in a generally longitudinal relation to the blade 2 enters opening 13 in insert 8 through slot 15 and passes upwardly over one of the diagonal edge portions 14 of the insert and thus is twisted transversely to the blade.

Conversely, the belt 6, prior to leaving the fixture through slot 15, passes downwardly over the other diagonal edge portion 14 of the insert 8 and into opening 13 and the direction of travel of the belt 6 is changed from transversely to longitudinally of the blade 2.

To aid the belt 6 in passing around the end portions of insert 8, a pair of rollers 17 may be rotatably secured at the ends of the insert between plates 9 and 10. The ends of the insert 8 are provided with suitable concave recesses which receive the respective rollers. To permit the fixture 5 to be inserted within various cross-sectional contours, rollers 17 may be provided with different radii. For example, as applied to a propeller blade, one of the rollers 17 may be provided with a radius approximately equal to the radius of the leading edge portion of the blade while the other roller may have a radius corresponding to the trailing edge of the blade so that the weld seams in the vicinity of these edge portions can be accurately ground.

Figure 3:
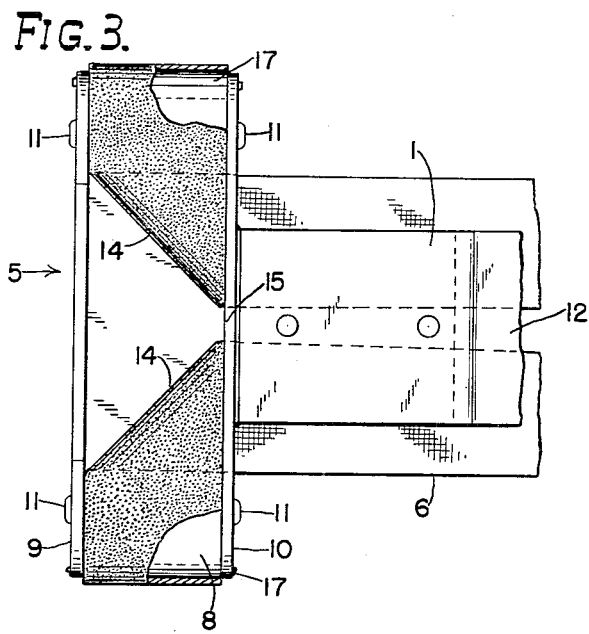
Fig. 3 is a top plan view of the fixture showing the route of travel of the belt thereon.
Figure 4:
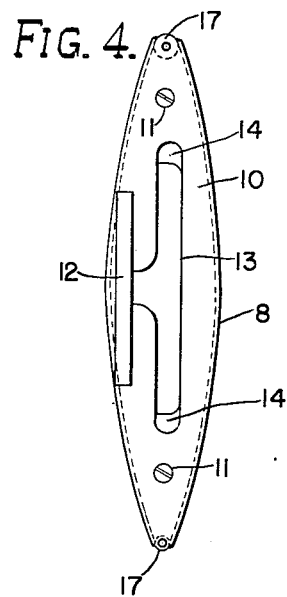
Fig. 4 is a rear view of the fixture of Fig. 3.

As seen in Fig. 3, the belt 6 traveling longitudinally to the blade 2, passes through slot 15 in plate 10 and enters opening 13 in insert 8. The belt then passes upwardly over one of the diagonal edge portions 14 of the insert where it is twisted transversely of the blade. The belt 6 then travels downwardly around one of the rollers 17 and continues in a transverse direction along the bottom surface of the insert 8 to the opposite end of the fixture. At this point the belt passes upwardly around the second roller 17, then transversely along the upper face of the insert and finally downwardly around the corresponding diagonal edge portion 14 into opening 13 where it emerges from the fixture through slot 15 in plate 10.

In the present invention the grinding of the internal transverse weld seams is done by the portion of the belt traveling along the lower surface of the insert 8 and by the portion of the belt traveling along the upper surface of the insert outwardly of the diagonal edges 14. The insert 8 serves as a supporting pad for the grinding operation. As the belt moves transversely rather than longitudinally the transverse seams can be effectively ground by merely moving the apparatus laterally over the entire seam rather than having to employ a multiplicity of short forward and rearward strokes as is usually necessary with a grinder utilizing a longitudinally traveling belt.

In addition, the belt can be utilized to grind the extreme edge portions of the blade due to the presence of end rollers 17 which are designed with radii corresponding to the contour of the edge portions.

Figure 2:
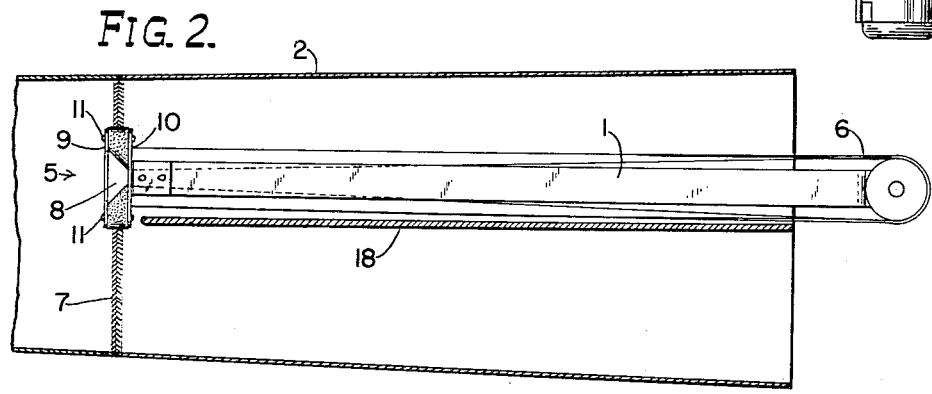
Fig. 2 is a top plan view of the grinder as disposed within the blade with the blade being broken away in section.

As the end portions of fixture 5 are outwardly offset from the frame member 1 and the connecting tongue 12, the fixture 1, as seen in Fig. 2, may be moved laterally behind the terminal point of the longitudinal rib 18 of blade 2 to grind the portion of the transverse weld seam 7 located at that point. Heretofore using the conventional grinding tools, it was an extremely difficult operation to grind that portion of the weld seam located behind the terminal point of the longitudinal rib 18.

The present invention provides a high speed belt grinder wherein the grinding is done at a considerable distance from the driving source and yet the grinding surface is firm and free from wobble so that the necessary pressure may be applied through the fixture against the weld seam.

A second embodiment of the invention is shown in Figs. 7, 8 and 9. This embodiment illustrates a modified fixture wherein the belt 6 approaches and leaves the fixture 19 moving longitudinally of the blade in a substantially horizontal plane.

To permit the belt 6 to be twisted transversely of the blade, the fixture is provided with a pair of rearwardly sloping shoulders 20. Shoulders 20 diverge rearwardly at an angle of about 45 degrees to the longitudinal axis of the fixture and are provided with smooth rounded edges to permit the belt to pass freely thereover. The belt 6, as shown in Fig. 7, moves onto the fixture and passes downwardly over one of the shoulders, then transversely along the bottom surface of the fixture and finally upwardly around the second of the shoulders where it passes from the fixture moving longitudinally of the blade.

To maintain the belt 6 in position on the fixture, the upper surface of the fixture is provided with a pair of suitable longitudinally extending slots within which the belt moves as it enters and leaves the fixture respectively. In addition, the belt is maintained in position when moving transversely by a slot 21 formed in the undersurface of the fixture between the shoulders 20.

The belt is guided when passing over the shoulders 20 by ears 22 which extend outwardly from the fixture adjacent the rearward end of each shoulder and serve to align the belt on the respective shoulders and prevent the belt from slipping from the shoulder.

In the embodiment the grinding action is accomplished by that portion of the belt 6 traveling transversely adjacent the undersurface of the fixture. This fixture is extremely simple in construction and formed with a minimum thickness. It is particularly adaptable to grinding the transverse weld seams located internally of an extremely thin hollow metal article or propeller blade within which the conventional type wheel grinder could not be inserted.

Various embodiments of the invention may be employed within the scope of the following claims.

I claim:

1. In an apparatus for grinding a metal surface, an endless abrasive belt adapted to be driven at high speed in contact with the article to grind the same, a generally thin fixture for carrying the belt and formed with a substantially flat grinding support surface disposed flatwise to the surface to be ground and having a pair of diagonally extending lateral edge portions bordering said support surface, said belt being adapted to approach and leave said fixture while traveling in a longitudinal direction to said fixture and traveling around each of said diagonally extending edge portions to travel the belt transversely of the fixture along the support surface to grind the article.

2. In an apparatus for grinding a metal surface, an endless abrasive belt adapted to be driven at high speed in contact with the article to grind the same, a generally thin fixture for carrying the belt and formed with a substantially flat grinding support surface disposed flatwise to the surface to be ground and having a pair of diagonally extending lateral edge portions bordering said support surface, said belt being adapted to approach and leave said fixture while traveling in a longitudinal direction to said fixture and traveling around each of said diagonal edges to travel the belt transversely of the fixture along the support surface, and a projecting member disposed at the outer extremity of said diagonal edge portions to maintain said belt on said edge portions and prevent slippage of the belt during operation.

3. In a grinding apparatus for use in grinding the internal transverse weld seams of a hollow metal propeller blade, a fixture disposed within said blade and rigidly connected through an elongated frame to a driving source and adapted to carry an endless abrasive belt driven by said driving source, said fixture comprising an insert shaped in general conformity to the internal contour of said article and having grinding support surfaces on opposite faces thereof, said insert being provided with an elongated central opening to receive and discharge said belt, a pair of diagonally extending diverging edge portions formed in one of said faces and bordering said opening, a pair of rollers rotatably secured at the ends of said insert to enable the belt to pass freely around said ends and provided with radii corresponding to the internal radius of the trailing edge and leading edge of the blade respectively, said belt approaching the blade while traveling in a direction substantially longitudinally of the blade and then passing within said opening and around one of said diagonal edge portions to change the direction of travel of said belt to a direction transversely of the blade, and said belt thereafter passing transversely over one of said faces, over the corresponding end roller, transversely along the other of said faces and then around the other of said rollers with said belt finally passing transversely along the first of said faces and around the other of said diagonal edges and being twisted thereon to emerge from said opening in a direction substantially longitudinal to the blade.

4. In an apparatus for grinding the transverse internal weld seams of a hollow metal article, an elongated frame, an endless abrasive belt, drive means disposed at one end of said frame for driving said belt at a relatively high speed in contact with the weld seams to grind the same, a fixture connected to the opposite end of the frame and disposed within said article and adapted to carry said belt, said fixture having a pair of diagonally extending rounded edges and an elongated grinding support surface extending between said edges with said surface being adapted to support the portion of the belt in contact with said weld seams, said fixture having a guide track extending longitudinally of the frame and generally normal to the longitudinal dimension of the support surface and terminating at said diagonal edges, said belt being adapted to enter the track on approaching the fixture and thereafter pass over the first of said diagonal edges and then travel over said support surface in a substantially transverse direction to the longitudinal axis of the frame, and the path of travel of said belt thereafter being changed to a direction substantially parallel to the longitudinal axis of the frame as the belt passes over the second of said diagonal edges prior to re-entering the track and leaving the fixture.

5. In an apparatus for grinding the internal weld seams of a hollow metal article, an elongated frame, drive means disposed at one end of the frame, a fixture connected to the opposite end of the frame and adapted to be disposed within said article, said fixture comprising an insert shaped in general conformity to the internal contour of said article and having grinding support surfaces on opposite faces thereof and extending between opposite ends of the insert, said insert being provided with an elongated central opening and a pair of diagonally extending diverging edge portions formed in one of the faces and bordering said opening, and an endless abrasive belt driven by said drive means and extending from said drive means through said opening and over one of said diverging edge portions and thereafter extending along the first of said faces and over the corresponding end of the insert and along the second of said faces and over the opposite end of the insert, and then along the first of said faces and over the second of the diverging edge portions and through said opening to said drive means.

References Cited in the file of this patent

UNITED STATES PATENTS

| | | |
|---|---|---|
| 266,257 | Hanson et al. | Oct. 17, 1882 |
| 681,636 | Furber | Aug. 27, 1901 |
| 1,999,275 | Bertrand | Apr. 30, 1935 |
| 2,363,728 | Grunwald | Nov. 28, 1944 |
| 2,445,391 | Elmes et al. | July 20, 1948 |
| 2,470,221 | Mott | May 17, 1949 |
| 2,573,220 | Riedesel et al. | Oct. 30, 1951 |